Sept. 11, 1934. G. J. HUNTLEY ET AL 1,972,994
METHOD OF AND APPARATUS FOR CARBONATING WATER
Filed Oct. 26, 1932 10 Sheets-Sheet 2

Inventor
George J. Huntley
Robert J. Stewart

By Cushman, Bryant, Darby & Cushman
Attorneys

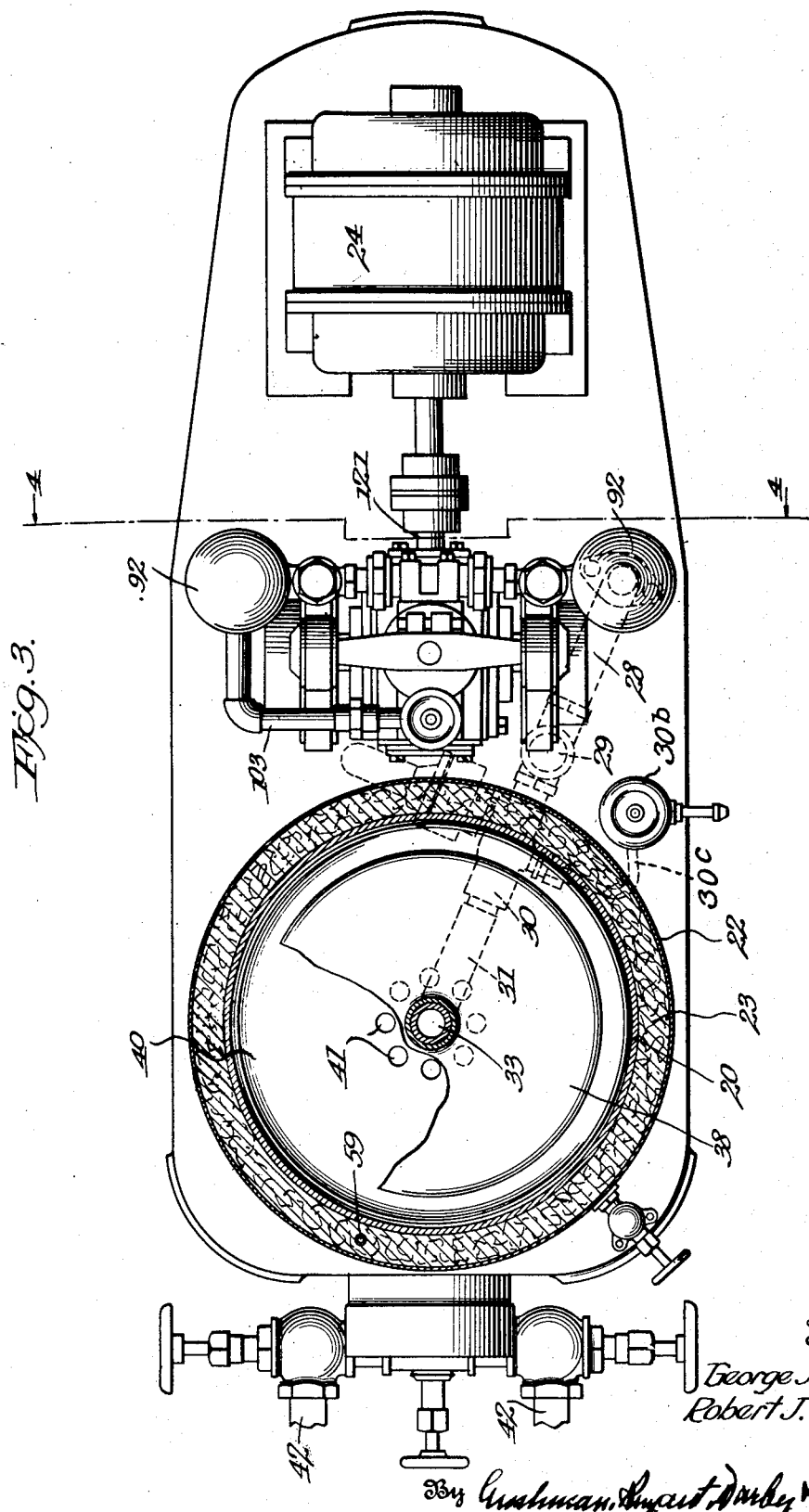

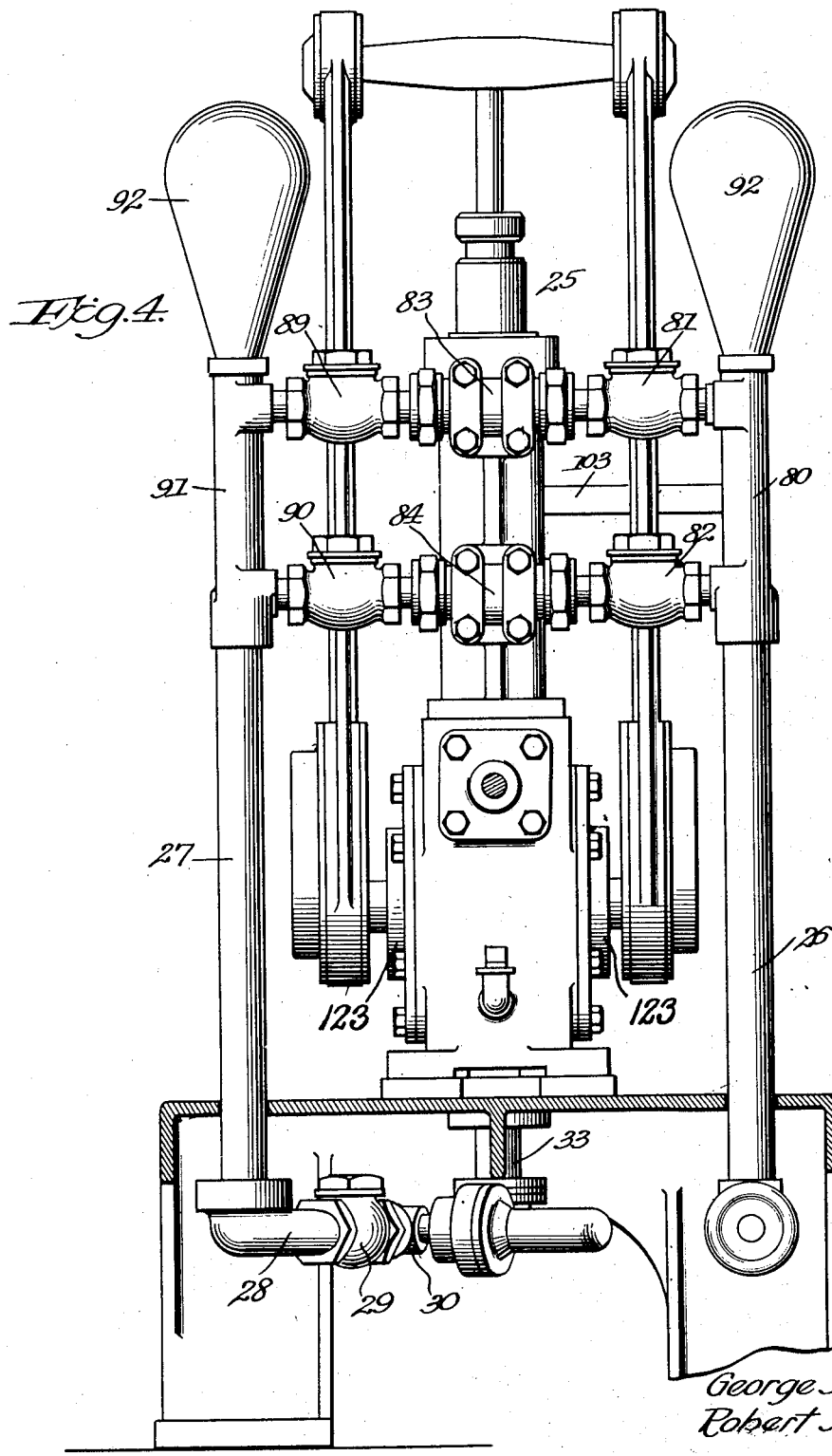

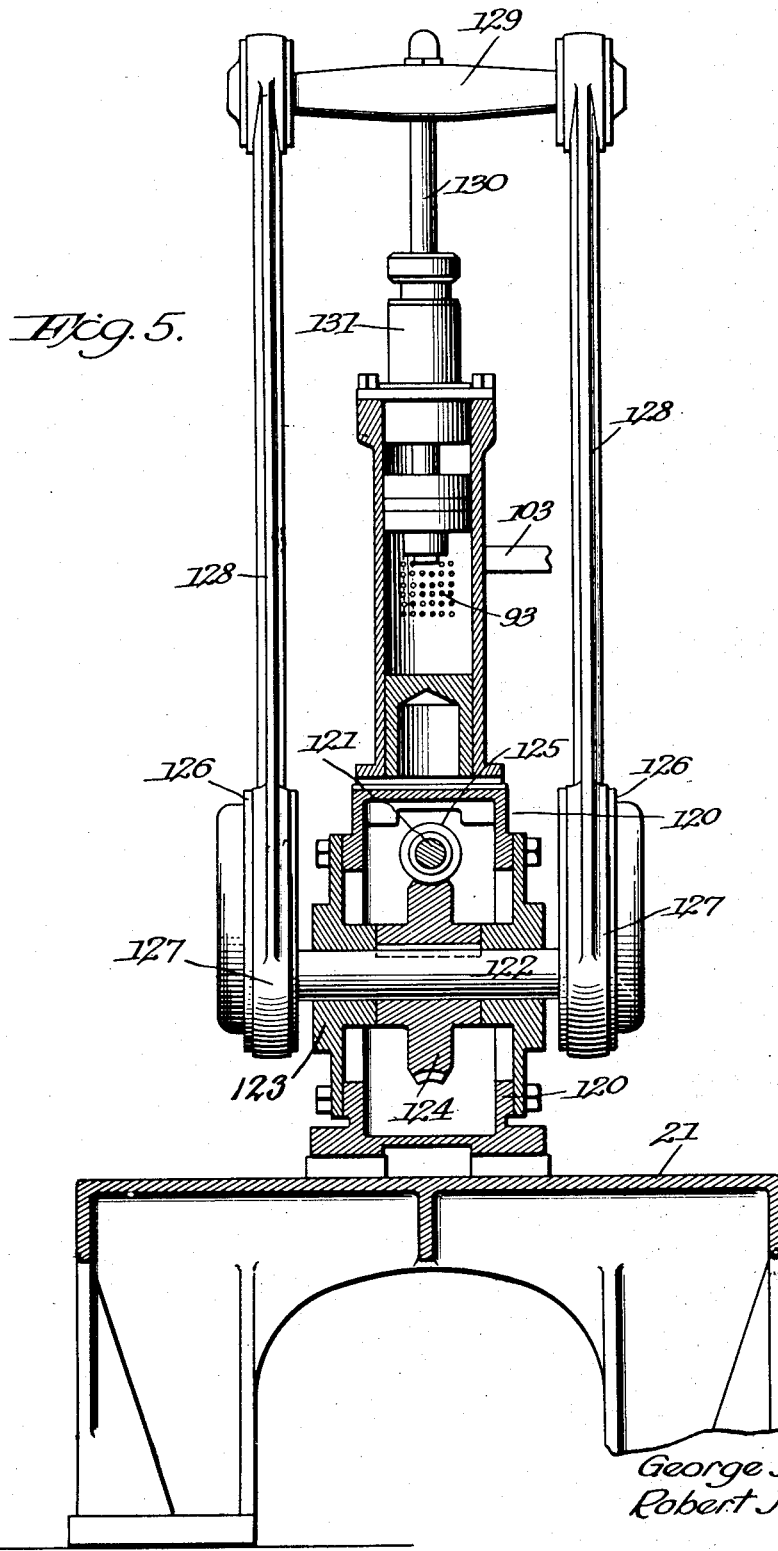

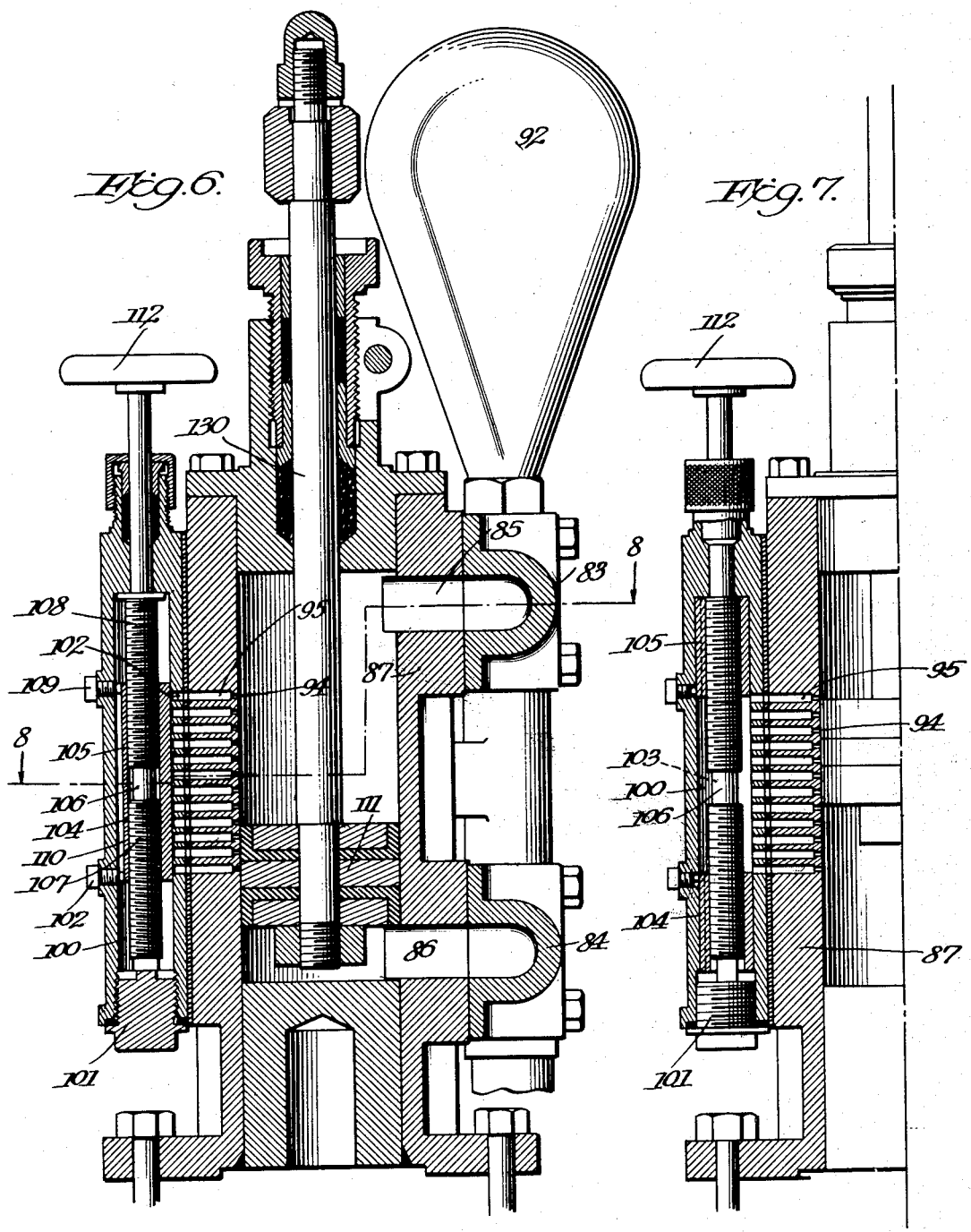

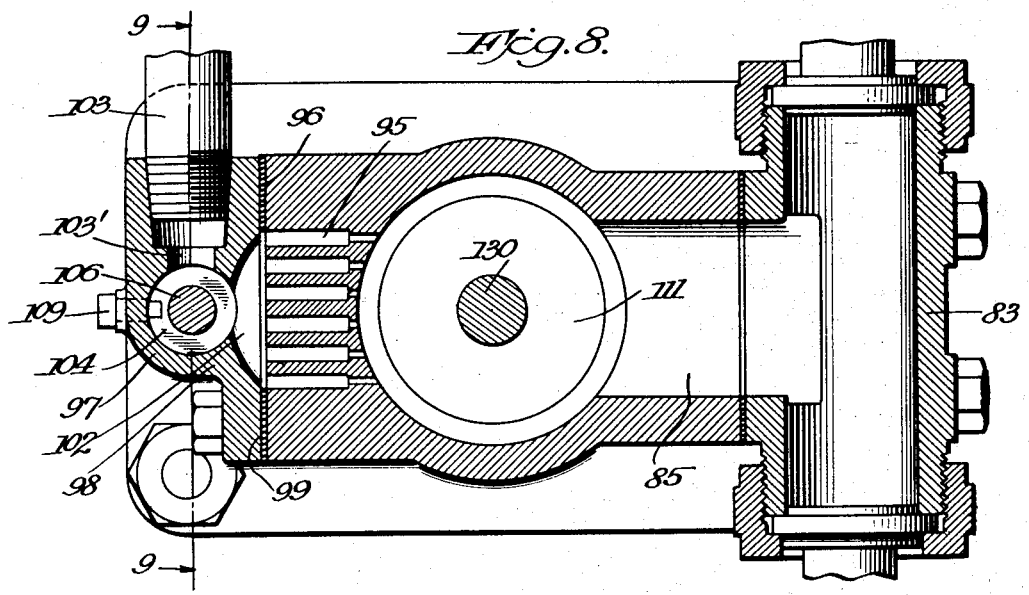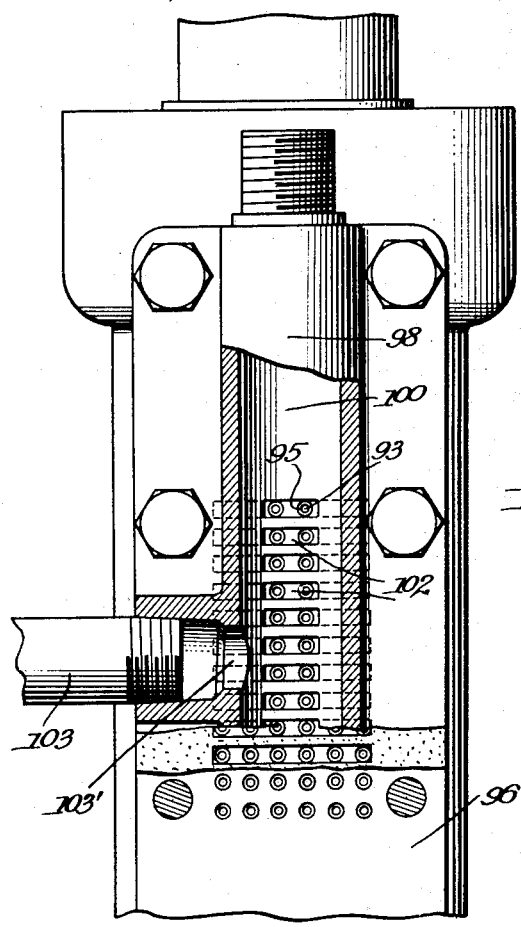

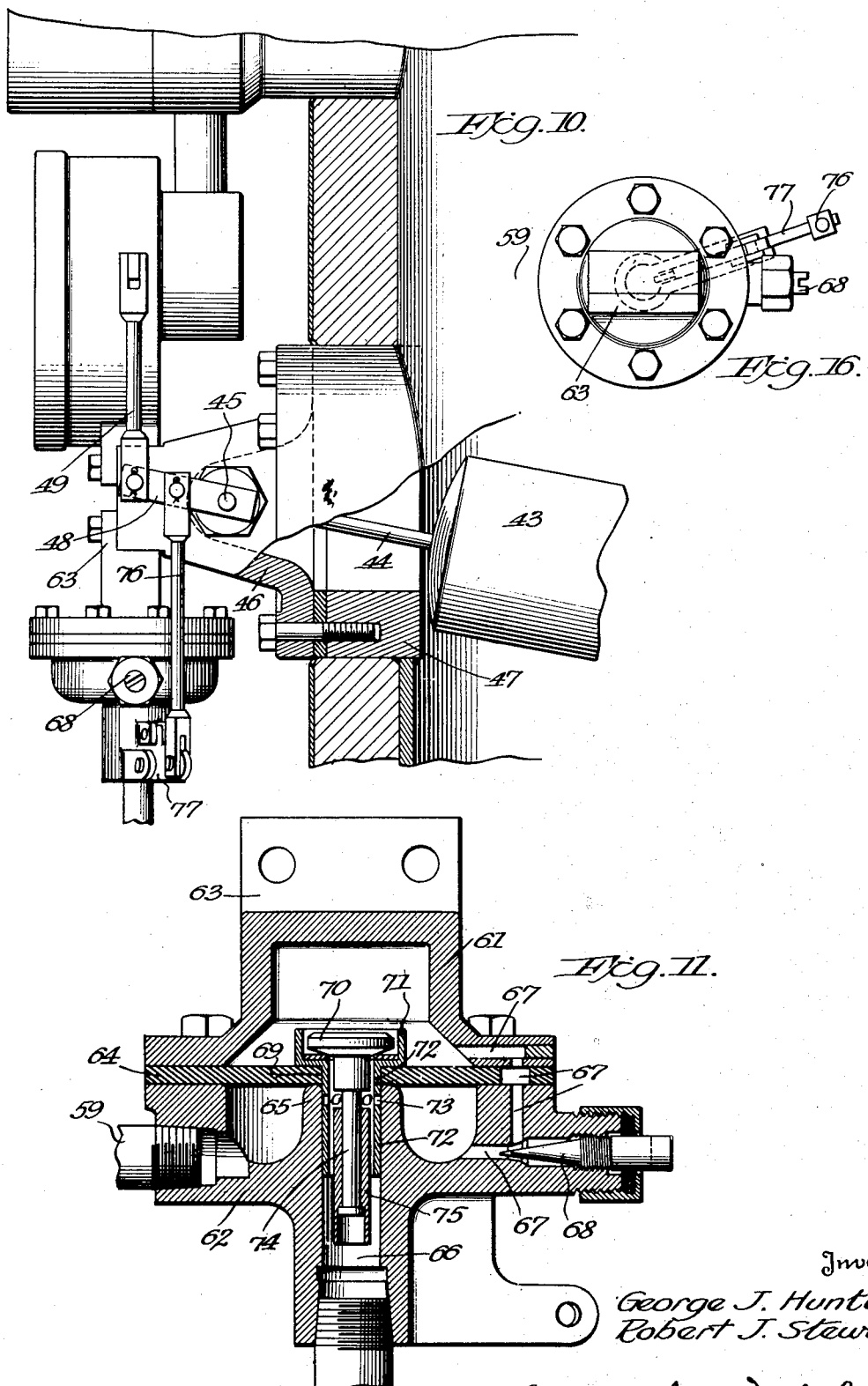

Sept. 11, 1934.   G. J. HUNTLEY ET AL   1,972,994
METHOD OF AND APPARATUS FOR CARBONATING WATER
Filed Oct. 26, 1932   10 Sheets-Sheet 9
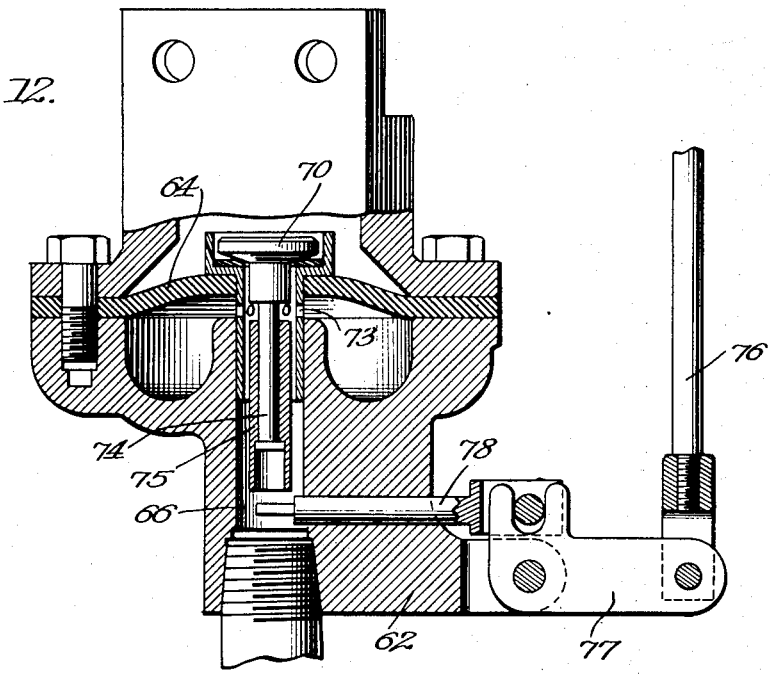
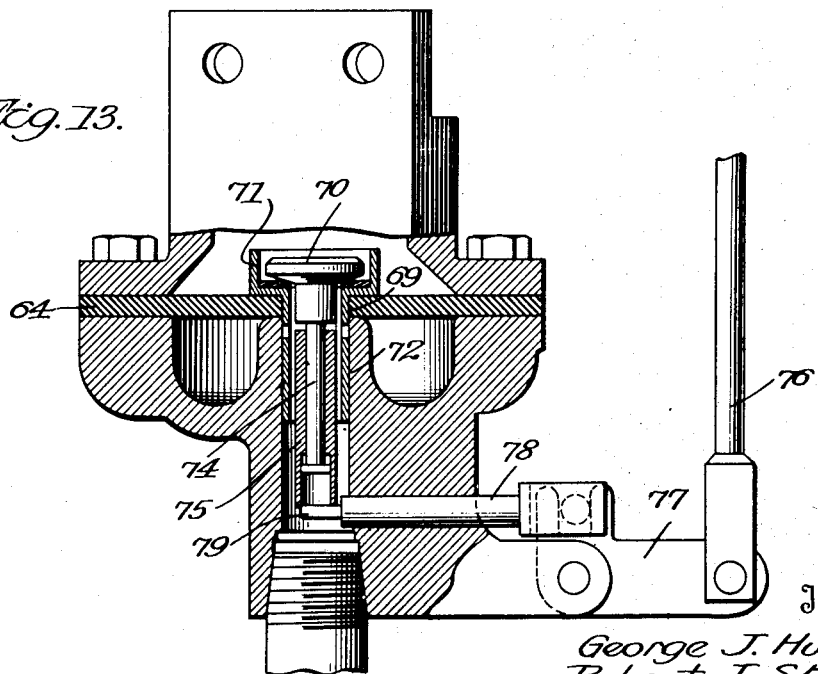
Inventor
George J. Huntley
Robert J. Stewart Sept. 11, 1934.　　　G. J. HUNTLEY ET AL　　　1,972,994
METHOD OF AND APPARATUS FOR CARBONATING WATER
Filed Oct. 26, 1932　　　10 Sheets-Sheet 10

Inventor
George J. Huntley
Robert J. Stewart

Patented Sept. 11, 1934

1,972,994

UNITED STATES PATENT OFFICE 1,972,994

METHOD OF AND APPARATUS FOR CARBONATING WATER

George John Huntley and Robert J. Stewart, Baltimore, Md., assignors to Crown Cork & Seal Company, Inc., Baltimore, Md., a corporation of New York Application October 26, 1932, Serial No. 639,705

15 Claims. (Cl. 261—19)

This invention relates to carbonators, or, in other words, to a method and apparatus for effecting the saturation of water with carbon dioxide gas.

It is a well known fact that water has a rather marked affinity for carbon dioxide gas, and will absorb the same to a certain degree whenever the surface of a body of water is brought into contact with a relatively pure atmosphere of the gas. The degree of ultimate absorption depends upon the temperature of the water and gas, and also on the pressure under which the gas and water are brought into contact with one another. As is well known to all those familiar with the carbonating of water, an increase in pressure results in an increase in the amount of gas that a given quantity of water will absorb at a particular temperature. Furthermore, a decrease in the temperature of the water will result in an increased absorption at a given pressure.

The rate or speed with which the water will absorb the gas at a given temperature and pressure is determined by the amount of surface area of the water brought into contact with the gas. Even though the surface area is small and is not changed repeatedly, maximum absorption of gas by a given quantity of water at a predetermined pressure and temperature will eventually be accomplished, but the process will be extremely slow. If the same body of water is agitated somewhat so that the surface area is constantly changing and is consequently effectively increased, the absorption of the gas by the water will be materially accelerated.

Commercial carbonators have taken advantage of these well known laws of physics in three ways. In the first place, the water temperature is reduced as much as practical. Secondly, the water and gas are brought together under substantial pressure. Thirdly, agitators or beaters have been placed in the carbonating tanks for the purpose of constantly and violently changing the surface area of the liquid to increase the effective absorption area thereof. The beaters of the prior art have been provided for no other purpose. Anyone familiar with the physical phenomena involved will appreciate that the beaters while breaking the water up into a fine spray or foam, facilitate absorption of the gas by the water only insofar as they increase the surface area of the water being treated. It is impossible, by the use of paddles or beaters, to "drive" or "pound" the gas into the water.

It will be equally apparent that the beaters or agitators of the prior art have many fundamental and marked disadvantages. Their violent action on the water necessarily sets up a high degree of friction between the particles of water themselves and the paddles, which must result in frictional heat, with a consequent raising of the temperature of the water. As stated above, as the temperature increases, the capability of the water for absorbing gas decreases. Consequently, the rise in temperature which necessarily results from the friction of the agitators, decreases the efficiency of the carbonating apparatus.

A further disadvantage of the agitator type of carbonator resides in the fact that the beaters cause substantial bodies of gaseous carbon dioxide to be intermingled with and mechanically entrained in the liquid as it leaves the carbonator. Thus, the outlet pipe from the carbonator to the bottling machine, or the like, contains, instead of a quiescent body of carbonated water, a mechanical mixture of carbonated water and carbon dioxide gas. Obviously, such a mixture cannot be used in a bottling machine, and it has, therefore, been necessary to provide gas and liquid separating tanks in the machine. In these tanks, the mechanically entrained gas rises upwardly and is discharged to atmosphere from time to time by a snifting operation. The gas thus snifted off is substantially pure carbon dioxide, and is totally wasted.

Carbonators of the agitator type have the further disadvantage that a substantial amount of power is used to drive the beaters, thus increasing the expense of the finished product.

Furthermore, the agitators or beaters and other moving parts associated therewith render the machine complicated, are naturally subjected to wear and replacement, must be continually lubricated, and generally make a troublesome piece of mechanism.

The primary object of the present invention is to provide an extremely efficient carbonating apparatus which includes no beaters, paddles, or other agitators. In contradistinction to the agitator type of carbonator, we designate the present type as a stationary carbonator. The apparatus of the present invention obviates all of the disadvantages mentioned above with respect to carbonators of the prior art.

Fully appreciating the fact that the absorption by the water of the gas is determined by the effective surface area of the water brought into contact with the gas under pressure, we provide means for making this area as large as possible, consistent with a machine of reasonable size. Results prove that as great an effective area is produced in the apparatus of the present invention as can be accomplished with an agitator type of carbonator of corresponding overall dimension. This large effective area is produced by spreading the water out into a thin sheet, permitting it to flow in contact with an atmosphere of carbon dioxide gas over a baffle plate, causing it to cascade from said plate downwardly onto another plate, where it again spreads out into a thin film and flows thereover, to again cascade to a third plate, etc. It has been discovered that the flowing of the water in a thin sheet from one baffle plate to another changes the effective surface of the body of water and renders different particles thereof capable of absorbing gas from the surrounding atmosphere.

Thus the present invention contemplates a plurality of baffle plates over which the water is adapted to spread out into a thin sheet and from each of which it is adapted to cascade to another.

In order to prevent the accumulation of mechanically entrained bodies of gas with the carbonated water discharged from the carbonator, a space at the lower end of the carbonating tank is provided in which the carbonated water is collected and stored in quiescent state. The water is drawn off from the bottom of this storage portion of the tank, and in view of the absence of agitators or the like, it is impossible for bodies of gas to be drawn outwardly through the outlet conduit to the bottling machine. This makes it wholly unnecessary to provide the separating tanks and snifting devices conventionally used in bottling machines. An important result is a material saving in the amount of gas consumed to carbonate a given volume of water.

In order to maintain a more or less constant volume of carbonated water in the storage portion of the carbonating tank, and to take care of a variable or intermittent consumption of carbonated water, we provide a float in the storage portion of the tank, which float controls an electric switch, or equivalent device, which in turn controls the supply of fresh water introduced under pressure to the carbonating tank. This control means conveniently takes the form of an electric motor connected in driving relation to a pump. When the float drops to a predetermined position, by reason of the consumption of a given amount of carbonated water, an electric circuit is closed, the motor starts, and the pump forces additional water into the tank to be carbonated by the means hereinafter described.

Another marked advantage of the use of a stationary carbonator resides in the fact that the relatively quiet state of water and gas within the tank permits a stratification of the gas therein and a separation of carbon dioxide gas and air. Whatever air enters the tank with the water, being lighter than the carbon dioxide gas, rises to the top of the tank, preferably into a specially provided air collecting space located above the gas and water inlet orifices. This relative separation of air and gas makes it possible to snift off, or discharge the air from time to time, so that an undue amount of air will not collect and the atmosphere in the tank will not be unduly diluted. In order to accomplish this desirable result, the apparatus of the present invention includes a conduit communicating with the upper air collecting portion of the tank at one end and with the external atmosphere at the other. Preferably automatic valve means are provided for occasionally opening this conduit and permitting the discharge of any air which may be collected in the tank. Necessarily, some carbon dioxide gas escapes with the air, but, by a proper adjustment of variable means associated with the valve means, the snifting operation continues for such a short length of time that a material amount of gas is not wasted.

The improved method of the present invention results largely from the fact that the atmosphere within the carbonating tank is always substantially pure carbon dioxide gas because of the occasional snifting of the air. As pointed out below, the snifting occurs immediately prior to, or in predetermined timed relation to, the introduction of additional water to the tank. Between each cycle of operation, that is, between each intermittent introduction of water, the carbonated water and the atmosphere within the tank are maintained in quiescent state for a substantial period of time. This permits stratification of the atmosphere into layers of gas and air, and since the air is snifted off prior to the introduction of additional water, commencing the next cycle, the water always encounters an atmosphere of pure gas.

It is a further object of the invention to provide a special type of liquid pump adapted to force water into the carbonator against gas pressure. In view of the fact that it is necessary, in order to secure maximum efficiency with an electric motor to run the same at a substantially constant speed, we have developed a pump which, although operating at a constant speed, has a variable output. In designing this pump, it has been a primary purpose to avoid subjecting the water to undue friction, such as would result if a bypass were provided on the high pressure, outlet side of the pump, because such friction would materially increase the temperature of the water and render the subsequent carbonation thereof more difficult. It will be readily understood that movement of water under pressure results in considerably more friction than a corresponding movement under little or no pressure. In order to take advantage of these facts, the present invention comprises a pump in which the water is bypassed from the pumping cylinder itself back to the pump inlet, before any substantial pressure is applied thereto.

This novel form of liquid pump will undoubtedly find many other uses than in association with a carbonating apparatus, and the invention is, therefore, not to be considered as limited to the use of such pump with such apparatus.

In addition to the broad aspects of the invention discussed above, the apparatus of the present application discloses many novel details and arrangements of parts, and the invention must be considered as including all of these features and their equivalents.

In the accompanying drawings, in which an illustrative embodiment of the invention is disclosed, Figure 1 is a side view of the apparatus, partly in section, and partly in elevation.

Figure 3 is a plan view of the apparatus showing the tank in horizontal section.

Figure 4 is an end elevation of the pump and associated parts taken on line 4—4 of Figure 3.

Figure 5 is a vertical sectional view taken through the cylinder of the pump.

Figure 6 is an enlarged sectional view of the pump and bypass gate valve assembly.

Figure 7 is a fragmentary showing similar to Figure 6, but disclosing the gate valve in a different position.

Figure 8 is a horizontal sectional view taken on line 8—8 of Figure 6.

Figure 9 is a sectional view taken on line 9—9 of Figure 8, but with the gates and operating rod removed.

Figure 10 is an elevational view, partly in section, of the float mechanism and its connections to the electrical circuit breaker and snifting valve.

Figure 11 is a vertical sectional view of the snifting valve assembly.

Figure 12 is a similar vertical sectional view taken on a different plane, and showing the valve in open position.

Figure 13 is similar to Figure 12, but shows the valve in closed position.

Figure 16 is a top plan view of the valve assembly casing.

Figure 1:
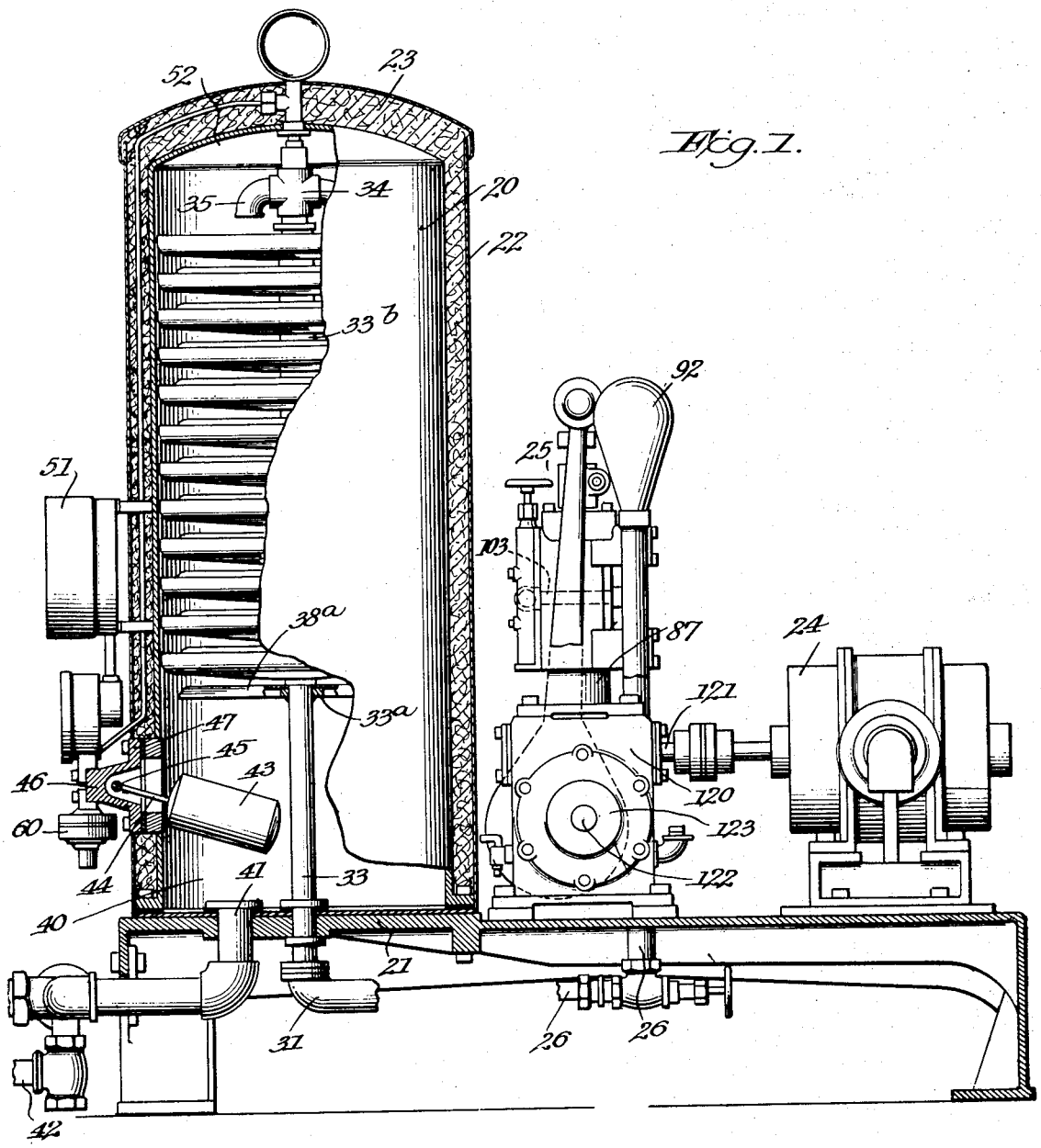

Referring to Figure 1, an elongated, upstanding, carbonating tank 20 is secured to an appropriate base 21 by any suitable means. Surrounding the tank and spaced therefrom is an outer finishing shell 22, and the space therebetween is filled with suitable heat insulating material 23. Also secured upon the base 21 is a prime mover in the form of an electric motor 24 connected in driving relation to a pump assembly represented generally at 25. Water from a suitable source, preferably a tank open to the atmosphere, is conducted to the pump by a valved conduit 26. Water is delivered from the pump 25 through a pipe 27 downwardly to a pipe 28 disposed below the base 21.

Figure 17:
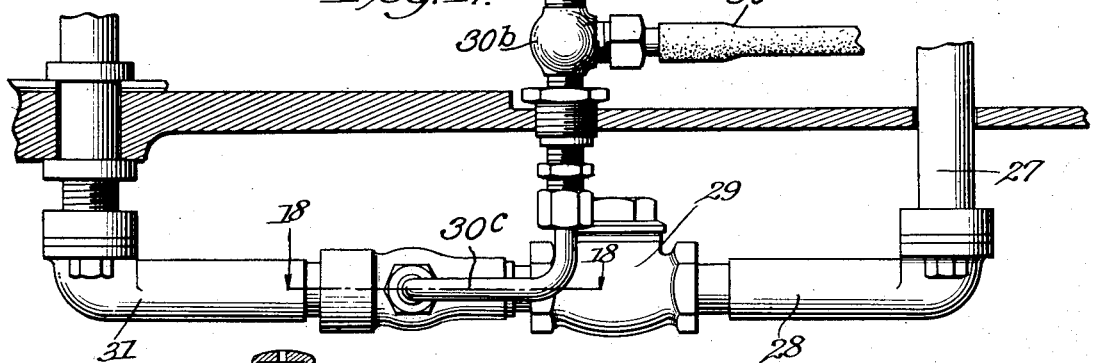
Figure 17 is a detail view showing the relation of the pump discharge conduit, gas injector fitting, and inlet conduit to the carbonator tank.

Referring to Figures 4 and 17, it will be seen that the water from the pump passes through a check valve 29, gas injector fitting 30 and conduit 31 to the carbonating tank. Associated with the injector fitting 30 is a spring loaded, pressure actuated safety valve 32, which functions in the usual manner to relieve excess pressure, should it accumulate in any part of the apparatus.

Figure 18:
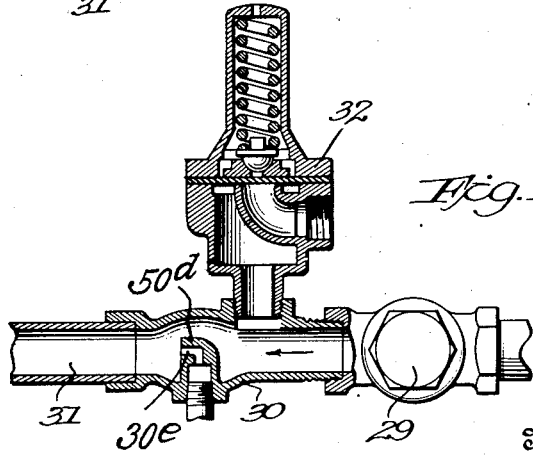
Figure 18 is a detail horizontal sectional view of Figure 17, taken on line 18—18 thereof, showing the gas injector nozzle and the safety valve construction.

Carbon dioxide gas under pressure is conveyed from a suitable drum through a conventional pressure regulating valve, not shown, to the gas injector fitting 30 by means of a hose or the like 30a, hand valve 30b appropriately mounted on base 21, and conduit 30c. The latter member has one of its ends connected to the valve assembly 30b, and its other end screw-threaded into an appropriate bore in the side of injector fitting 30. This bore is formed in an inwardly projecting boss 30d having a laterally extending small orifice 30e, which functions as an injector nozzle for the gas. The water from the pump travels in the direction of the arrow, Figure 18, and the orifice 30e discharges the gas in the same direction, which results in a preliminary mixing and partial saturation of water and gas in the pipe 31.

The pipe 31 leading from the gas injector is adapted to convey both water and gas to the vertically disposed pipe 33 which extends upwardly centrally of the tank 20. This pipe adjacent its upper end is provided with an X-fitting 34, two laterally disposed discharge elbows 35 and a hollow plug 36 which serves to accurately center the pipe in the tank by reason of its cooperation with a specially constructed centering plug 37 welded or otherwise secured to the top of the tank. This member 37 performs an additional function besides centering the pipe 33 and associated parts, as will be explained below.

Figure 2:
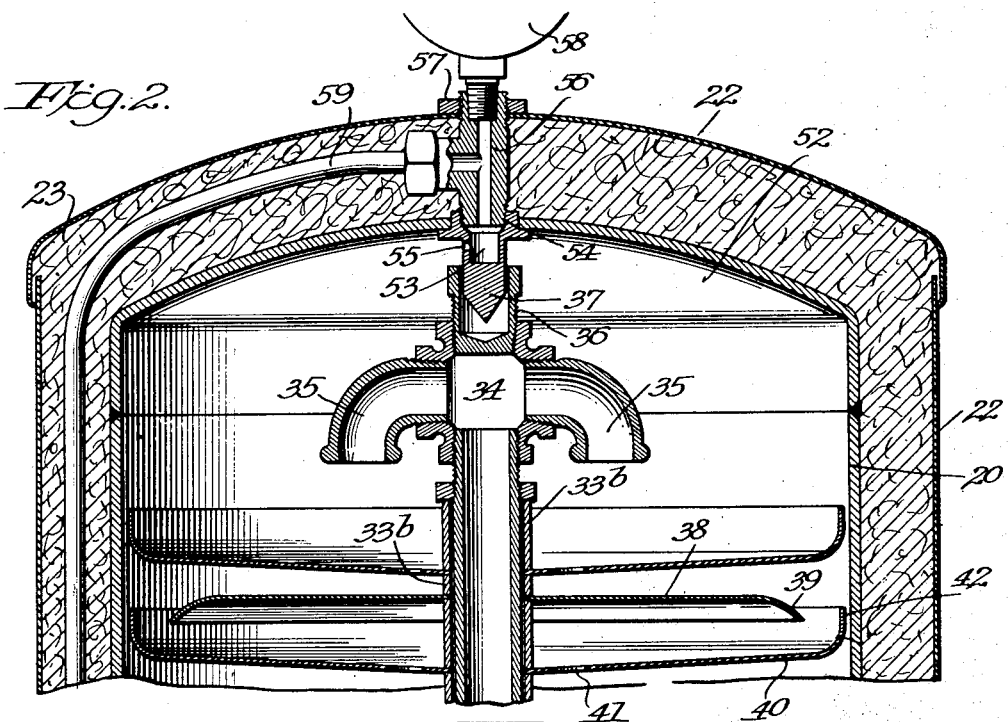
Figure 2 is an enlarged vertical sectional view taken through the upper end of the tank and parts therein.

A plurality of sets of baffle plates are mounted upon the central pipe 33 in open spaced relation, by means of ring 33a welded to the pipe and spacer collars 33b. Each set comprises a dispersing plate 38 (Fig. 2) upon which water to be carbonated is discharged centrally, and upon which the water spreads out into a thin film and flows radially outwardly toward the periphery. The peripheral portion of each plate 38 is preferably turned downwardly, as indicated at 39, to facilitate the uniform fall of the water over the edge thereof. Below each plate 38 is disposed a second plate 40, which is adapted to collect the water discharged thereon from the edge of the plate 38, spread the same into a second sheet and cause the sheet to flow radially inwardly. Each plate 40 is provided with a series of openings 41 arranged in annular relation around the center thereof adjacent the pipe 33. The outer peripheral portion 42 of each plate 40 is turned upwardly so as to be spaced from and surround the downwardly turned edge 39 of the dispersing plates 38.

Thus, water flows outwardly on the plates 38, cascades over the downturned peripheries thereof, is caught by the upturned peripheral portions of the plates 40, spreads out and flows inwardly on said latter plates, and is subsequently discharged through the openings 41 onto the central portions of the next lower dispersing plates 38. This cycle of operation continues through the many sets of baffle plates provided in the carbonating tank. Consequently, the water introduced adjacent the upper end of the tank is worked upon by the baffles to increase to a maximum its effective surface area. The water is spread out to present a maximum surface on each plate, and its transfer, by gravity, from a particular plate to the next lower one, agitates the water sufficiently to expose a new surface to the surrounding atmosphere of carbon dioxide gas when it flows thereon. Furthermore, the surface of the sheet of water on each plate is constantly changed in accordance with well known principles of hydraulics, as the thin sheet flows. Frictional drag between the lower surface of the sheet in contact with the plate causes that surface to lag behind the upper surface of the sheet, with the result that the water particles experience a rolling movement, one over another, to present a constantly changing upper surface in contact with the gas. This phenomenon is noticeable to a marked degree because a thin sheet of water is provided on each plate.

The vertical series of baffle plates mounted within the tank 20 terminates a substantial distance above the bottom of the tank, and consequently there is left a relatively large, substantially unoccupied space 40 which is adapted to serve as a collecting and storage portion for the carbonated water. As stated above, water cascades downwardly from the lowermost dispersing plate 38a into the space 40 and is there collected and stored in quiescent state. An outlet fitting 41 is provided in the bottom of the tank and this fitting, leads to the carbonator discharge 42. Water is conveyed through the pipe 42 to a bottling machine, or other point of consumption.

In the collecting and storing portion 40 of the carbonator tank, there is provided a float 43, which is adapted to control the intermittent operation of the carbonator, depending upon the level of liquid therein. The float is secured to an arm 44 which, at its other end, is fixed to a transverse shaft 45 journalled in appropriately packed bearings in a housing 46 secured to a reinforcing ring 47 welded in the tank wall. The shaft 45 extends outside of the housing 46 and is provided adjacent its outer end with a crank arm 48. Pivotally connected to a portion of this crank arm is an upwardly extending connecting link 49 which, at its upper end, is connected to an operating lever 50 of a mercury switch 51. This mercury switch is of conventional construction, and the details thereof are no part of the present invention. Consequently, its specific structure will not be described. The arrangement of the elements just described is such that when the level of carbonated water in the storage portion of the tank 20 drops to a predetermined point, the float 43, through arm 44, shaft 45 and crank 48, raises link 49 and operating lever 50 of the mercury switch 51 to complete the electric circuit to the driving motor 24. The motor starts, and the pump driven thereby functions to deliver additional water to be carbonated through the inlet elbows 35 at the upper end of the carbonating tank. This action is usually an intermittent one, because the capacity of the pump is normally adjusted by a means described below, to exceed the consumption of the bottling apparatus. Thus, a surplus of carbonated water is provided in the tank at all times.

As stated above, the apparatus of the present invention includes means for automatically permitting an occasional discharge of any air which may collect in the carbonating tank. This occasional discharge is termed, in the art, a "snifting" operation.

The water discharging elbows 35 are preferably disposed in the tank in such a manner as to provide a substantial space 52 thereabove. This space serves as a collecting portion for air which may be introduced into the tank with the water. The plug 37, which serves to center the upstanding pipe 33 and associated parts, is provided with an axial bore 53 terminating in a threaded upper end section 54 and a laterally disposed orifice 55. A T-fitting 56 is threaded into the portion 54 of the plug and is disposed in the packed space between the tank and the outer shell 22. The upper end of the T extends through the shell, is secured by a nut 57 and carries a pressure gauge 58. The lateral branch of the T-fitting is connected to an outlet pipe 59 disposed in the heat insulating material 23, and the lower end thereof is connected to an automatic snifting valve assembly 60.

Figure 14:
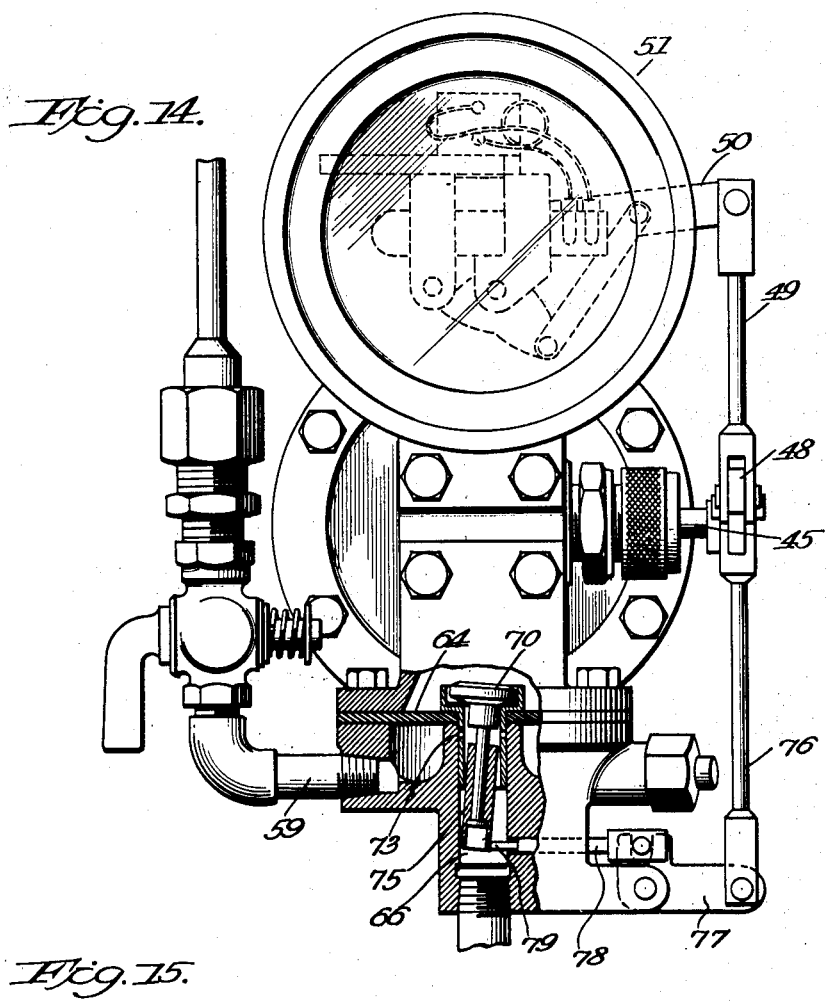
Figure 14 is an elevational view, with certain parts broken away, taken from the left of Figure 10. The snifting valve assembly is shown in another position during its normal cycle of operation.

The valve assembly comprises a casing made up of upper and lower sections 61, 62, the upper being provided with an extension 63 adapted to be secured to the housing 46 previously described. The space within the casing is substantially bisected by a flexible diaphragm 64, which may conveniently be formed of rubber or the like. The interior of the lower casing section is formed with an integral upstanding boss 65 having a central bore 66 therein. The diaphragm 64 is adapted to seat upon the upper end of the boss, as clearly shown in Figures 11, 13 and 14. The casing sections and the diaphragm 64 are provided with a bypass passage 67 adapted to establish limited communication between the upper and lower sides of the diaphragm. Means for varying the effective area of the bypass passage are provided, and this conveniently takes the form of an adjustable needle valve 68.

The diaphragm 64 has a central aperture 69 located therein, in alignment with the bore 66 of the boss. A valve 70 for normally preventing, but occasionally permitting, the passage of gaseous fluid from the upper side of the diaphragm through the aperture 69 is provided. In order to prevent undue wear between the valve 70 and the edges of the aperture 69 in the diaphragm, there is provided a valve seat member 71 having a cup-shaped upper end and a downwardly extending sleeve portion 72 in closely fitting relation to the aperture 69 and the bore 66 of boss 65. Apertures 73 are formed in the sleeve for a purpose to be described below.

The valve 70 has a depending stem 74, upon which is slidably mounted a sleeve 75 extending into the bore 66.

Figure 15:
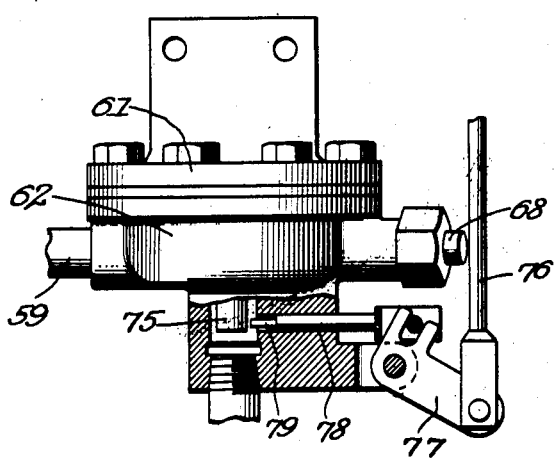
Figure 15 is an elevational view, with certain parts broken away showing the parts of the valve assembly in still another position.

Means are provided for occasionally canting or tilting valve 70 to permit the snifting operation, described below. This means conveniently takes the form of a linkage system connected to the float crank 48 and comprising a rod 76, bell crank 77 pivotally secured to the lower valve casing section 62, and a horizontally reciprocable plunger 78. The plunger 78 extends through the wall of the lower casing section into the bore 66 in position to contact the lower end of sleeve 75. Thus, when the float drops, due to a lowering of the level of carbonated liquid in the tank, crank 48, rod 76, and bell crank 77 are moved upwardly from position shown in Figure 15 to that disclosed in Figure 14. As a consequence, plunger 78 moves inwardly and the end 79 thereof strikes the lower end of the sleeve 75 to cant the valve 70 as disclosed in Figure 14.

In view of the fact that the carbonator tank pressure has been established on both sides of the diaphragm 64 by a flow of gaseous fluid through the pipe 59 and bypass 67, a canting of the valve 70 permits gas to flow from the upper side of the diaphragm through the bore 66 to atmosphere, with a resulting reduction of pressure above the diaphragm. The pressure below the diaphragm raises the same from its seat on the boss 65, and the diaphragm carries the valve 70 and sleeve 75 upwardly. This action establishes a direct communication between the upper portion of the carbonating tank with atmosphere through pipe 59, apertures 73 in sleeve 72 and bore 66. Whatever air has collected in the upper portion of the tank is thus shifted off. The bypass 67 permits gaseous fluid under pressure to flow from the lower side of the diaphragm to the space in the casing thereabove. As soon as pressure is re-established on the upper side of the diaphragm, the same moves downwardly and seats on the boss 65 to terminate the snifting operation. The adjustable needle valve 68 in the bypass determines the effective cross-sectional area of the same and consequently determines the length of time required to re-establish the necessary closing pressure above the diaphragm. Thus, by changing the position of the valve 68, the duration of the normal snifting operation may be widely varied.

Sleeve 75, having limited sliding movement on the valve stem 74 permits the diaphragm and its associated parts to seat, irrespective of the position of the plunger 78. As shown in Figure 13, the diaphragm, valve seat member 71, and stem 74 may move downwardly before the plunger 78 is retracted, because the disposition of the end 79 of the plunger in the path of the sleeve 75 merely arrests the sleeve, but does not affect the movement of the other parts. As soon as the plunger 78 is retracted to the position shown in Figure 15, by an upward movement of the float, the sleeve 75 drops downwardly into position to be subsequently tilted by the plunger.

It will be seen, therefore, that, although the position of the float 43 determines the commencement of the snifting operation, it has nothing to do with the duration thereof. The float and the elements actuated thereby merely serve to cant the valve 70 to set in operation the snifting assembly which includes means for automatically reassuming closed position.

As previously stated, water from any suitable source, such as a tank open to the atmosphere, is conveyed to the carbonator through the valved conduit 26 which connects with an upright section communicating with the inlet header 80 of the pump 25. Two conduits lead from the header 80 through check valves 81, 82 to opposite ends of the pump. These conduits are connected to the pump by means of special double ended fittings 83, 84, the interior of each of which communicates with ports 85, 86 disposed respectively at opposite ends of the pump cylinder 87. Ports 85, 86 act as both inlet and outlet ports, drawing water in through check valves 81, 82 and forcing the same outwardly through the fittings 83, 84 and check valves 89, 90 to the outlet header 91 and pipe 27. Appropriate air cushion chambers 92 are mounted on the upper ends of the headers 80, 91, so as to effect an even, non-pulsating flow of water.

In the wall of cylinder 87, substantially diametrically opposite the ports 85, 86 are a plurality of apertures 93 extending entirely through the cylinder wall and establishing communication from the interior of the cylinder to the outside of the same. These apertures are preferably arranged in vertical and horizontal rows, substantially as disclosed in Figure 5. Each aperture comprises a relatively small, inner portion 94 and an enlarged rear bore 95. On the outside of the cylinder opposite the plain face 96 through which the bores 95 extend, there is secured a valve assembly 97 which is adapted to control the passage of water through the apertures. This assembly comprises a housing member 98 having a plain face 99 adapted to be secured in water tight relation to the face 96 of the cylinder, a substantially cylindrical interior chamber 100 closed at its lower end by a plug 101, and a plurality of horizontally disposed kerfs, slots, or passages 102 communicating with the chamber and aligned in registry with each horizontal row of bores 95. The chamber 100 also communicates with a laterally disposed orifice 103' and bypass 103, which leads around to the inlet header 80.

The chamber 100 is designed to act as a valve receiving space and to this end a pair of cylindrical gate valve members 104, 105 are mounted therein upon an operating rod 106. The rod is provided with oppositely threaded sections 107, 108 adapted to cooperate with correspondingly threaded bores in the gate members 104, 105, respectively. Set screws 109, having their ends disposed in appropriate keyway slots 110 in the gate members, prevent rotation thereof with the operating rods.

The fit between the outer surface of the valve members 104 and 105 and the inner surface of the cylindrical chamber 100 is substantially water tight, and as a result, the flow of water through each of the kerfs 102 is prevented when it is closed by the gate. At the same time, the flow of water through a particular horizontal row of apertures 93 is prevented.

As a result of this construction, it will be seen that the effective pumping stroke of the piston 111 may be varied by the position of the gates. If all of the apertures 93 and kerfs 102 stand closed by the gates, as shown in Figure 6, the apertures will be ineffective, and each pumping stroke of the piston will force water outwardly through the port 85 throughout the entire length of its travel. On the other hand, if hand wheel 112 is rotated, and the gates opened somewhat to a position between those disclosed in Figures 6 and 7, a few, say four, of the horizontal rows of apertures will be in communication through the uncovered or opened kerfs 102 with the chamber 100 and the bypass conduit 103. Thus, on the compression stroke of the piston, water, instead of being forced under pressure through the outlet port 85 will flow under substantially atmospheric pressure through the opened apertures 93. It will then be bypassed through chamber 100, and conduit 103 around to the inlet header 80. Because the inlet side of the pump is under substantially no greater pressure than atmosphere, this bypassing of the water will result in the creation of little or no frictional heat. The piston 111 will not be effective as a pumping piston to discharge water through the outlet port 85 until, during a subsequent portion of its pumping stroke, it has covered up the opened orifices 93. From that point onward to the end of its compressing stroke in that direction, it will force water outwardly through the port 85 to the carbonator tank.

When the gates 104, 105 are in the completely opened position disclosed in Figure 7, the pump will have only a very short compression stroke, and its output will be materially reduced.

By the mechanism just described, it is possible to accurately control the volume of water discharged by the pump, without changing the speed of its operation. Furthermore, this means permits the variation of volume without increasing pressure, and without setting up undue friction in the water under pressure, which would result in increasing the temperature of the same.

An important feature of the invention relates to the driving means for the pump. By the novel construction embodied in this application, the use of a cumbersome, complicated and expensive cross-head, with its consequent need for lubrication and attention is eliminated. The driving structure has been so arranged that the usual side thrust imparted to the piston rod, which thrust has previously necessitated the use of a cross-head, has been largely eliminated. Secured to the base 21 is a housing 120 upon the upper end of which is secured the pump cylinder. The driving shaft 121 from the electric motor 24 is journaled in this housing adjacent the upper end thereof. A short transverse shaft 122 is also journaled by means of bearing plates 123 in the housing, and upon this shaft is keyed a worm follower gear 124 adapted to be driven by a worm 125 on the shaft 121. On the outer ends of the shaft 122, outside of the housing are secured eccentrics 126 and straps 127. These straps connect through pitmen 128 with a yoke 129 to which is secured the upper end of the piston rod 130.

By arranging the parts in this desirable relation, and particularly because of the utilization of extremely long pitmen 128, no substantial side thrust is imparted by the eccentrics 126 to the piston rod 130. Consequently, it is unnecessary to provide a cross-head bearing for the rod 130 spaced a substantial distance from the pump cylinder. It has been found that with the present construction, a slightly elongated, packed bearing 131 entirely suffices.

The carbonating apparatus of the present invention is a marked improvement over carbonators of the prior art, not only because of its simplicity, efficiency, and freedom from the necessity for constant attention, but also because of its inherent flexibility. Because of the variable elements of this apparatus, it is possible to determine accurately the degree to which the water will be carbonated at any predetermined desired temperature and pressure. This degree of carbonation necessarily is controlled by the relation between (a) the area of the baffle plates over which the water is spread into a thin sheet, (b) the volume of the water flowing over the plates, and (c) the time during which the water flows over the plates in contact with the gas. The water temperature remains substantially constant at all times and is therefore not a material consideration, unless it is desired to vary the same. The same is true of the gas pressure, because the carbonator is normally used to supply carbonated water at a definite pressure to filling machines and the like. In the present apparatus, the surface area of the baffle plates is constant, but it can be changed by taking down the apparatus and removing one or more plates. The rate or volume of flow of the water into the carbonator and over the plates, however, may be varied between wide limits. This is accomplished by the means described above associated with the carbonator pump. By varying the rate or volume of flow, the degree of absorption of the gas by the water flowing over the baffle plates can be controlled. Thus, by the use of previously computed formulæ and tables, the operator of the present apparatus may accurately determine the degree of saturation of the water taken from the carbonator.

Such controlling of the degree of saturation presents many advantages, particularly in the bottling of beverages. With carbonators of the prior art, it has been impossible to produce carbonated water of a definite, predetermined, and constant degree of partial saturation, although carbonated water of this type has many advantages over completely saturated carbonated water, and is useful for many purposes. By the method of the present invention, carbonated water at a fixed temperature and pressure may be produced, having a definite, predetermined percentage of carbonation less than the maximum. In other words, a predetermined degree of partial or under saturation may be accomplished. In the past attempts have been made to control the degree of under-saturation by (a) raising the pressure of the carbonated water after it leaves the carbonator by a booster pump, or the like, or (b) diluting the carbonated water with a predetermined volume of uncarbonated water. Such methods, however, are accompanied by various practical difficulites, and they have not satisfactorily solved the problem of producing carbonated water of controlled degree of partial saturation. The method of the present invention is the first in the art which produces carbonated water of controlled degree of partial saturation by controlling the relation of area of flow, to volume of flow, to time of flow of water in an atmosphere of carbon dioxide gas.

The present method of producing carbonated water having a controlled degree of under-saturation is particularly useful when the carbonator is associated with certain new types of filling machines, known as the gravity filling, balanced pressure systems. There is always a drop in pressure and a rise in water temperature between a carbonator and a filling machine of this type. If completely saturated water is produced in the carbonator, in accordance with conventional practice, the subsequent drop in pressure and rise in water temperature results in an over-saturated solution in the filling machine and the excess gas must come out of solution. This excess gas must be snifted to atmosphere from the tank in the filling machine, and thus it is wasted. Furthermore, such over-saturated water is highly unstable and results in undesirable foaming in the filled bottle before the cap is applied. A substantial period of time must be permitted to elapse between the filling operation and the capping operation, to permit the liquid to become relatively quiescent. Such time lag results in slowing down the machine operation.

With the present method, carbonated water may be produced in the carbonator at a pressure exceeding that of the filling machine by the desired differential. This water, however, is saturated only to a predetermined percentage of the maximum, or, in other words, its degree of under or partial saturation is controlled. As a consequence, when the water temperature is raised during its travel to the filling machine, and its pressure lowered, the water will not be over-saturated, but will be substantially 100% saturated. Because of this condition of the water, no gas need be liberated in the filling machine tank, and a wasteful snifting operation is unnecessary. Furthermore, excessive foaming of the liquid in the bottle is prevented, and the bottle may be capped immediately, without slowing down the filling and capping process.

Thus, the method of controlling the degree of partial saturation, which is accomplished by the present invention, results in a great saving in the amount of carbon dioxide gas used to carbonate and bottle a predetermined number of cases of beverage, and the filling and capping operations are materially speeded up, resulting in increased output of the bottling plant.

The method of controlling the degree of partial saturation is also useful in producing certain types of beverages in which only a small degree of carbonation is desired. The machine can be adjusted so that a very low content of carbon dioxide gas, for any desired temperature and pressures, is produced.

Although the method and apparatus disclosed in this application have been described in considerable detail, it must be understood that this description is for the purpose of illustration only, and is not to be considered as limiting the scope of the invention as defined in the appended claims.

We claim:—

1. A carbonating apparatus comprising a base, a substantially cylindrical upright carbonating tank mounted on said base, a water infeed pipe, and baffle means in said tank for effecting contact between water and carbon dioxide gas therein, said pipe extending upwardly through said base and being supported thereby, said pipe being positioned axially in the tank and secured adjacent the upper end of the tank against lateral displacement, said pipe having a discharge opening adjacent its upper end below the point of securement, said baffle means comprising a plurality of plates centrally secured to and supported by said pipe in spaced relation thereon below said discharge opening, and being shaped and positioned to cause water discharged from said pipe to flow under gravity in a labyrinthine path to a lower portion of the tank.

2. A carbonating apparatus comprising a base, a substantially cylindrical upright carbonating tank mounted on said base, a water infeed pipe, and means for effecting intimate contact between water and carbon dioxide in said tank, said tank comprising a lower water collecting and storing portion, an intermediate carbonating portion, and an upper air collecting portion, said infeed pipe extending upwardly through said base and being supported thereby adjacent its lower end, and being secured at its upper end centrally with respect to the tank against lateral displacement therein, said pipe having a discharge opening near the upper end of the tank but below the air collecting portion, said water and gas contacting means comprising a plurality of baffle plates centrally secured to and supported by said pipe in spaced relation thereon in said carbonating portion of said tank and being positioned to receive water from said discharge opening and shaped to cause water received thereon to flow in a labyrinthine path to said water collecting and storing portion of the tank.

3. A carbonating apparatus comprising a tank, a combined water and gas inlet adjacent an upper portion of said tank, a plurality of baffles located in said tank below said inlet, said baffles being disposed to impart a labyrinthine flow to said water in its downward travel under gravity, said tank having an upper air collecting chamber above said inlet and a lower water collecting portion adjacent its lower end in which carbonated water is collected and stored in quiescent state, a valved air discharge conduit communicating with said upper chamber, and an outlet for said water communicating with said lower collecting portion, and means in said lower collecting portion actuated by the level of liquid therein to control the admission of water to said tank through said inlet and to open the valve in said air discharge conduit in predetermined, timed relation to said admission of water.

4. A carbonating apparatus comprising a carbonating tank, means for introducing carbon dioxide gas under pressure into said tank at a point in the upper portion of said tank spaced from the top wall thereof, a water pump arranged to force water under pressure into said tank at said point against the pressure of gas therein, stationary means in said tank over which said water is caused to flow in a labyrinthine path in contact with said gas to be carbonated thereby, a water collecting and storing portion adjacent the bottom of said tank, an air and gas collecting portion adjacent the top of said tank above the water and gas inlet adapted to collect air and light gases rising thereto, a gas outlet in said upper portion adjacent the top wall of said tank, and means for jointly controlling the operation of said pump to admit water to said tank and said gas outlet to permit the escape of air collected in said upper portion of said tank.

5. A carbonating apparatus comprising a carbonating tank, means for introducing water and carbon dioxide gas under pressure into said tank at a point in the upper portion of said tank spaced from the top wall thereof, stationary means in said tank over which said water is caused to flow in a labyrinthine path in contact with said gas to be carbonated thereby, a collecting and storing portion adjacent the bottom of said tank, an air and gas collecting portion adjacent the top of said tank above said water inlet adapted to collect air and light gases rising thereto, a gas outlet in said upper portion adjacent the top wall of said tank, and automatic means jointly controlling said gas outlet and the introduction of water into said tank, to permit the escape of air collected in said upper portion of said tank in predetermined timed relation to the introduction of additional water to be carbonated, said automatic means being effective at intervals determined by rate of consumption of carbonated water from said carbonator.

6. A carbonating apparatus comprising a carbonating tank, means for introducing water and carbon dioxide gas under pressure into said tank at a point in the upper portion of said tank spaced from the top wall thereof, stationary means in said tank over which said water is caused to flow in a labyrinthine path in contact with said gas to be carbonated thereby, a collecting and storing portion adjacent the bottom of said tank, an air and gas collecting portion adjacent the top of said tank above said water inlet adapted to collect air and light gases rising thereto, a valved gas outlet in said upper portion adjacent the top wall of said tank, and automatic valve opening means arranged to open the valve in said outlet to permit the escape of air collected in said upper portion of said tank, said automatic means being effective at intervals determined by rate of consumption of carbonated water from said carbonator, and variable means associated with said automatic means, and adapted to close said valve and thereby determine the duration of the escape of air at each interval independently of the said automatic valve opening.

7. A carbonating apparatus comprising a carbonating tank, an inlet through which water and carbon dioxide gas under pressure may be introduced into said tank at a point in the upper portion but spaced from the upper wall of said tank, stationary means in said tank over which said water flows a labyrinthine path in contact with the gas, a receiving portion for carbonated water adjacent the lower end of said tank, an air collecting portion adjacent the upper end of said tank above the water and gas inlet, said collecting portion being adapted to receive by gravity stratification and separation any air mixed with said gas, a valved conduit from said collecting portion to atmosphere, a float in said water receiving portion of said tank, operative connections between said float and said valve in said conduit, whereby said valve is opened and air discharged to atmosphere when said float assumes a predetermined position, and variable means for determining the duration of time said valve remains open and the duration of said discharge of air, independently of the position of said float.

8. A carbonating apparatus comprising a carbonating tank, means for introducing carbon dioxide gas under pressure into said tank at a point in the upper portion of said tank spaced from the top wall thereof, an electrically driven pump and conduits for introducing water into said tank at said point, stationary means in the said tank over which said water is caused to flow in a labyrinthine path in contact with said gas to be carbonated thereby, a water collecting and storing portion adjacent the bottom of said tank, an air collecting portion adjacent the top of said tank above the point of introduction of water and gas, a valve assembly in communication with said air collecting portion of the tank, a float in said water collecting portion having an operative connection with the electrically driven pump and an operative connection with said valve assembly to open the valve simultaneously with the starting of said pump, said valve assembly including means for maintaining said valve open for a substantial period of time, and means for closing said valve irrespective of the position of said float and said operative connections.

9. A carbonating apparatus comprising a tank into which water is forced against carbon dioxide gas pressure therein by an electrically driven force pump, said tank having an upper portion adapted to collect air and light gases by gravity stratification, an intermediate portion adapted to effect carbonation of the water without mechanical agitation, and a lower collecting and storing portion for the carbonated water, a conduit leading from the air collecting portion of the tank to atmosphere and a valve assembly interposed therein, a float in the water collecting portion of the tank operatively connected to a starting switch for said electrically driven pump and also operatively connected to said valve assembly, whereby said float, when assuming a predetermined position, will close said switch to start the pump and open the valve in said assembly to permit the discharge of air from said air collecting portion, said valve assembly including variable means for determining the time said valve remains open and for closing the same irrespective of the position of said float or the operative means connected thereto, whereby the duration of the air discharging operation is independent from the introduction of water to the tank.

10. The method of carbonating water comprising introducing a stream of water into an atmosphere of substantially pure carbon dioxide gas under pressure, filming and flowing said water under gravity in contact with said atmosphere to carbonate the same without mechanical agitation, collecting the water so carbonated, terminating the flow of said stream after a predetermined amount of carbonated water has been collected, maintaining said atmosphere in quiescent state to permit any air which may have been carried by said water in said stream and introduced therewith into said atmosphere to be separated from said atmosphere by stratification while said water is not flowing, discharging the separated air from said atmosphere in timed relation to the subsequent introduction to said atmosphere of another stream of water, and terminating said discharge independently of the continuation of flow of said second stream of water, whereby the atmosphere into which said stream is introduced is always substantially pure carbon dioxide gas.

11. In the manufacture of carbonated water by a process including filming and flowing all of the water of a stream of water over a predetermined plate area in an atmosphere of carbon dioxide gas, the method of controlling the degree of saturation less than the maximum at a predetermined temperature and pressure which comprises maintaining said area over which the water films and flows substantially constant and controlling the volume of said stream to control the effective contact with said gas of the water filming and flowing over said area and the degree less than the maximum, of absorption of the gas by the water, maintaining the volume of flow constant and thereby permitting the water so filming and flowing in contact with the gas to absorb only a predetermined portion of the maximum amount of gas possible at that temperature and pressure to produce carbonated water of a constant and desired degree of less than maximum saturation for the said temperature and pressure, and thereafter collecting the water without diluting the same with plain water and maintaining the partially saturated water in substantially quiescent state.

12. In the manufacture of carbonated water by a process including flowing all of the water of a stream of water over an area in an atmosphere of carbon dioxide gas for a substantial period of time, the method of controlling the degree of saturation less than the maximum at a predetermined temperature and pressure which comprises controlling the relation of the volume of said stream to the size of said area and to the duration of said period of time, to produce a definite degree of partial saturation, varying the volume of flow while maintaining the area and time substantially constant to permit said stream of water to absorb different amounts of gas less than the maximum when a change in the degree of saturation of said water is desired, and maintaining the volume of flow and the other factors constant to produce carbonated water of a constant and desired degree of partial saturation without diluting said partially saturated water with additional plain water.

13. In the manufacture of carbonated water by a process including flowing all of the water of a stream of water over an area in an atmosphere of carbon dioxide gas for a substantial period of time, the method of controlling the degree of saturation less than the maximum at a predetermined temperature and pressure which comprises controlling the relation of the volume of said stream to the size of said area and to the duration of said period of time and thereby permitting said stream of water to absorb a definite amount of gas less than the maximum at said temperature and pressure to produce a definite degree of saturation, varying at least one of those factors while maintaining the others constant to change the amount of gas absorbed by said stream when a change in the degree of saturation of said water is desired, and maintaining said factors constant to produce carbonated water of a constant and desired degree of partial saturation without diluting the carbonated water with plain water.

14. The method of carbonating water in controlled percentage of partial saturation by flowing a stream of water in contact with an atmosphere of carbon dioxide gas which comprises the steps of flowing a stream of water of predetermined volume over an area of predetermined size in said atmosphere for a predetermined period of time and permitting the water to absorb only a fraction of the maximum amount of gas possible at that temperature and pressure, controlling the relation of said volume, area, and time to produce the desired percentage of partial saturation without diluting the carbonated water so produced with plain water.

15. The method of carbonating water in controlled percentage of partial saturation by flowing a stream of water in contact with an atmosphere of carbon dioxide gas which comprises the steps of flowing a stream of water of predetermined volume over an area of predetermined size in said atmosphere for a predetermined period of time and permitting the water to absorb only a fraction of the maximum amount of gas possible at that temperature and pressure, and controlling and varying the volume of said stream to control and vary the percentage of partial saturation desired without diluting the carbonated water so produced with plain water.

GEORGE JOHN HUNTLEY.
ROBERT J. STEWART.